United States Patent
Aingaran et al.

(10) Patent No.: US 9,251,272 B2
(45) Date of Patent: Feb. 2, 2016

(54) RECONFIGURABLE HARDWARE STRUCTURES FOR FUNCTIONAL PIPELINING OF ON-CHIP SPECIAL PURPOSE FUNCTIONS

(71) Applicant: Oracle International Corporation, Redwood Shores, CA (US)

(72) Inventors: Kathirgamar Aingaran, San Jose, CA (US); Garret F. Swart, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 380 days.

(21) Appl. No.: 13/789,524

(22) Filed: Mar. 7, 2013

(65) Prior Publication Data
US 2014/0095748 A1   Apr. 3, 2014

Related U.S. Application Data

(60) Provisional application No. 61/709,142, filed on Oct. 2, 2012.

(51) Int. Cl.
*G06F 17/30* (2006.01)
*G06F 9/54* (2006.01)
(Continued)

(52) U.S. Cl.
CPC ........ *G06F 17/30867* (2013.01); *G06F 9/3851* (2013.01); *G06F 9/3867* (2013.01);
(Continued)

(58) Field of Classification Search
CPC ............ G06F 17/474; G06F 17/30424; G06F 17/30442; G06F 17/30498; Y10S 707/99932
USPC ......................................... 710/104; 707/718
See application file for complete search history.

(56) References Cited

U.S. PATENT DOCUMENTS

RE34,052 E    9/1992   Hester et al.
5,423,010 A    6/1995   Mizukami
(Continued)

FOREIGN PATENT DOCUMENTS

EP    1 111 500 A1    3/1996
EP    2040180 A1    3/2009
(Continued)

OTHER PUBLICATIONS

W. Cockshott et al., "High-Performance Operations Using a Compressed Database Architecture", The Computer Journal, vol. 41, 1998, 14 pages.
(Continued)

*Primary Examiner* — Brian Misiura
(74) *Attorney, Agent, or Firm* — Hickman Palermo Becker Bingham LLP

(57) ABSTRACT

A method and apparatus for reconfiguring hardware structures to pipeline the execution of multiple special purpose hardware implemented functions, without saving intermediate results to memory, is provided. Pipelining functions in a program is typically performed by a first function saving its results (the "intermediate results") to memory, and a second function subsequently accessing the memory to use the intermediate results as input. Saving and accessing intermediate results stored in memory incurs a heavy performance penalty, requires more power, consumes more memory bandwidth, and increases the memory footprint. Due to the ability to redirect the input and output of the hardware structures, intermediate results are passed directly from one special purpose hardware implemented function to another without storing the intermediate results in memory. Consequently, a program that utilizes the method or apparatus, reduces power consumption, consumes less memory bandwidth, and reduces the program's memory footprint.

20 Claims, 7 Drawing Sheets

(51) Int. Cl.
*G06F 9/38* (2006.01)
*G06F 12/08* (2006.01)
*G06F 12/12* (2006.01)
*G06F 15/173* (2006.01)
*G06F 12/14* (2006.01)
*G06F 21/62* (2013.01)
*H04L 29/06* (2006.01)
*G06F 15/78* (2006.01)

(52) U.S. Cl.
CPC ............ *G06F 9/546* (2013.01); *G06F 12/082* (2013.01); *G06F 12/0804* (2013.01); *G06F 12/12* (2013.01); *G06F 12/1408* (2013.01); *G06F 12/1475* (2013.01); *G06F 15/17331* (2013.01); *G06F 15/7889* (2013.01); *G06F 17/30324* (2013.01); *G06F 17/30442* (2013.01); *G06F 17/30483* (2013.01); *G06F 17/30495* (2013.01); *G06F 17/30498* (2013.01); *G06F 17/30501* (2013.01); *G06F 17/30519* (2013.01); *G06F 17/30578* (2013.01); *G06F 17/30595* (2013.01); *G06F 21/6209* (2013.01); *H04L 69/14* (2013.01); *Y02B 60/188* (2013.01)

(56) References Cited

U.S. PATENT DOCUMENTS

| | | | |
|---|---|---|---|
| 5,581,705 A | 12/1996 | Passint et al. | |
| 5,617,567 A | 4/1997 | Doktor | |
| 5,761,653 A | 6/1998 | Schiefer et al. | |
| 5,826,259 A | 10/1998 | Doktor | |
| 5,974,408 A | 10/1999 | Cohen et al. | |
| 6,047,081 A | 4/2000 | Groezinger et al. | |
| 6,317,824 B1 | 11/2001 | Thakkar et al. | |
| 6,349,310 B1 | 2/2002 | Klein et al. | |
| 6,671,797 B1 | 12/2003 | Golston | |
| 6,745,174 B2* | 6/2004 | Levy et al. | 707/702 |
| 6,826,522 B1 | 11/2004 | Moller et al. | |
| 6,842,848 B2 | 1/2005 | Hokenek et al. | |
| 7,047,252 B2* | 5/2006 | Buch et al. | 707/718 |
| 7,725,595 B1 | 5/2010 | Geissler et al. | |
| 7,737,983 B2 | 6/2010 | Brothers et al. | |
| 7,769,726 B2 | 8/2010 | Gitai et al. | |
| 7,861,060 B1 | 12/2010 | Nickollis et al. | |
| 7,877,379 B2 | 1/2011 | Waingold et al. | |
| 7,991,794 B2* | 8/2011 | Bedi et al. | 707/796 |
| 8,049,760 B2 | 11/2011 | Jiao et al. | |
| 8,126,855 B2 | 2/2012 | Faerber et al. | |
| 8,260,803 B2* | 9/2012 | Hsu et al. | 707/769 |
| 8,285,709 B2* | 10/2012 | Candea et al. | 707/714 |
| 8,326,810 B2 | 12/2012 | Faerber et al. | |
| 8,521,788 B2 | 8/2013 | Ellison et al. | |
| 8,533,216 B2* | 9/2013 | Burger et al. | 707/769 |
| 8,543,534 B2* | 9/2013 | Alves et al. | 707/601 |
| 8,572,131 B2 | 10/2013 | Ellison et al. | |
| 8,666,970 B2 | 3/2014 | Albrecht et al. | |
| 8,725,707 B2* | 5/2014 | Chen et al. | 707/702 |
| 8,938,644 B2* | 1/2015 | Clark et al. | 714/16 |
| 8,996,463 B2* | 3/2015 | Merriman et al. | 707/637 |
| 2002/0184392 A1 | 12/2002 | Parthasarathy et al. | |
| 2002/0188830 A1 | 12/2002 | Boles et al. | |
| 2005/0177706 A1 | 8/2005 | Lee | |
| 2007/0091102 A1 | 4/2007 | Brothers et al. | |
| 2007/0203925 A1 | 8/2007 | Sandler et al. | |
| 2008/0046686 A1 | 2/2008 | Cameron | |
| 2008/0114724 A1 | 5/2008 | Indeck et al. | |
| 2008/0162876 A1 | 7/2008 | Bou-ghannam et al. | |
| 2008/0294863 A1 | 11/2008 | Faerber et al. | |
| 2009/0037700 A1 | 2/2009 | Graham | |
| 2010/0030796 A1 | 2/2010 | Netz et al. | |
| 2010/0088309 A1 | 4/2010 | Petculescu et al. | |
| 2010/0278446 A1 | 11/2010 | Ganesh et al. | |
| 2010/0299316 A1 | 11/2010 | Faerber et al. | |
| 2011/0029557 A1 | 2/2011 | Raghavan et al. | |
| 2012/0054225 A1 | 3/2012 | Marwah et al. | |
| 2012/0191698 A1 | 7/2012 | Albrecht et al. | |
| 2012/0303633 A1 | 11/2012 | He et al. | |
| 2013/0151567 A1 | 6/2013 | Ellison et al. | |
| 2013/0151568 A1 | 6/2013 | Ellison et al. | |
| 2013/0275473 A1 | 10/2013 | Ellison et al. | |
| 2014/0013076 A1 | 1/2014 | Ganesh et al. | |
| 2014/0013077 A1 | 1/2014 | Ganesh et al. | |
| 2014/0013078 A1 | 1/2014 | Ganesh et al. | |
| 2014/0095468 A1 | 4/2014 | Aingaran et al. | |
| 2014/0095534 A1 | 4/2014 | Aingaran et al. | |
| 2014/0095748 A1 | 4/2014 | Aingaran et al. | |
| 2014/0096145 A1 | 4/2014 | Aingaran et al. | |
| 2015/0026434 A1 | 1/2015 | Basant et al. | |

FOREIGN PATENT DOCUMENTS

| | | |
|---|---|---|
| EP | 2423843 A1 | 2/2012 |
| JP | 2000261674 A | 9/2000 |
| WO | WO 00/08552 | 2/2000 |
| WO | WO2010/039895 | 4/2010 |
| WO | WO 2013/095653 A1 | 6/2013 |
| WO | WO 2013/095662 A1 | 6/2013 |

OTHER PUBLICATIONS

Notification of Transmittal of the International Search Report and the Written Opinion of the International Searching Authority, or the Declaration, PCT Application No. PCT/US2012/068526, dated Mar. 20, 2013, 11 pages.

Claims from PCT Application No. PCT/US2012/068526, dated Mar. 2013, 3 pages.

Notification of Transmittal of the International Search Report and the Written Opinion of the International Searching Authority, or the Declaration, PCT Application No. PCT/US2012/068531, dated Mar. 20, 2013, 11 pages.

Wikipedia, "SIMD", Single Instruction Multiple Instruction, dated Jan. 1, 2013, 7 pages.

Wikipedia, "In Memory Database", Dated Jan. 30, 2013, 4 pages.

Brewer et al., "Remote Queues: Exposing Message Queues for Optimization and Atomicity", dated 1995 ACM, 12 pages.

Von Eicken et al., "Active Messages: A Mechanism for Integrated Communication and Computation", dated 1992, ACM, 12 pages.

U.S. Appl. No. 13/916,284, filed Jun. 12, 2013, Office Action, Aug. 15, 2014.

U.S. Appl. No. 13/778,307, filed Feb. 27, 2013, Office Action, Aug. 20, 2014.

U.S. Appl. No. 13/708,060, filed Dec. 7, 2012, Notice of Allowance, Apr. 29, 2013.

Vaidya et al., "A Novel Multicontext Coarse-Grained Reconfigurable Architecture (CGRA) for Accelerating Column-Oriented Databases", AMC Transactions on Reconfigurable Technology and Systems, vol. 4. No. 2 Article, Publication date: May 2011, 30 pages.

IBM, "Technical Disclosure Bulletin", Data Packing and Unpacking Scheme for High Performance Image Processing, vol. 36, No. 7, dated Jul. 1993, 6 pages.

Brewer et al., "Remote Queues: Exposing Message Queues for Optimization and Atomicity", dated Jul. 17, 1995, ACM, 12 pages.

Weinhardt, Markus, "Compilation and Pipeline Synthesis for Reconfigurable Architectures", 1997, 8 pages.

Schmit et al., "PipeRench: A Virtualized Programmable Datapath in 0.18 Micron Technology", dated 2002, 4 pages.

Park et al., "Polymorphic Pipeline Array: A Flexible Multicore Accelerator with Virtualized Execution for Mobile Multimedia Applications", Dated Dec. 12, 2009 11 pages.

Silva et al., "Using a Tighly-Coupled Pipeline in Dynamically Reconfigureable Platform FPGAs", dated May 2003, 4 pages.

Dynamic Scheduling Techniques, http://www.cs.iastate.edu/~prabhu/Tutorial/PIPELINE/dynamSchedTech.html, printed on Jul. 4, 2012, 2 pages.

CCCP: Accelerator Virtualization, http://cccp.eecs.umich.edu/research/virtual.php, printed on Jul. 4, 2012, 3 pages.

Actian, "Vectorwise: Beyond Column Stores", Technical White Paper, dated 2012, 17 pages.

(56) References Cited

OTHER PUBLICATIONS

Monet DB, "Column Store Features", http://www.monetdb.org/Home/Features, last accessed on May 1, 2012, 3 pages.
Wikipedia, "Monet DB", http://en.wikipedia.org/wiki/MonetDB, last accessed on May 1, 2012, 3 pages.

IBM Technical Disclosure Bulletin, "Data Packing and Upacking Scheme for High Performance Image Processing", vol. No. 7, dated Jul. 1993, 6 pages.

U.S. Appl. No. 13/778,307, filed Feb. 27, 2013, Notice of Allowance, May 5, 2015.

* cited by examiner

RECONFIGURABLE HARDWARE STRUCTURES FOR FUNCTIONAL PIPELINING OF ON-CHIP SPECIAL PURPOSE FUNCTIONS

CROSS-REFERENCE TO RELATED APPLICATIONS

Benefit Claim

This application claims the benefit of Provisional App. No. 61/709,142, filed Oct. 2, 2012, under 35 U.S.C. §119(e). The entire contents of each of Provisional App. No. 61/709,142 is hereby incorporated by reference as if fully set forth herein.

FIELD OF THE INVENTION

The present invention relates to reconfigurable hardware that can pipeline the execution of multiple special purpose hardware implemented functions without the need to save intermediate results to memory.

BACKGROUND

Commonly, software implements logic for functions that are executed serially, such that the output of a first function is used as input in a second function. The technique of using the output of a first function as the input to a second function is called pipelining.

A common example of pipelining is illustrated using Unix shell commands. For example, a user may wish to decompress a file, search within the file for a particular string, generate some statistics based on the particular string, and return the results. From the command line, a user could execute one program at a time and store the intermediate results from each preceding command to non-volatile storage for the next program to use as input. Alternatively, a user could use shell operators to pipeline the intermediate results from a first program to a second program, such that the final result alone is stored to non-volatile storage, e.g.:

tar xfzO foo.tar.gz|grep "I am a happy bee"|wc>bar.txt

In the example above, tar decompress and extracts data from a file. The results are piped through standard output to grep, which scans for all lines that contain the phrase "I am a happy bee." The lines with the phrase "I am a happy bee" are piped to wc, which generates some statistics on the lines. The statistics are then stored to non-volatile storage in a file named bar.txt. Using Unix shell pipeline operators non-volatile storage may be accessed by tar alone, and the final results alone may be stored to non-volatile storage by the Unix shell. The intermediate programs, grep and wc are never required to access or store data to non-volatile storage. Even when using pipelining as shown above, however, the result of each program is saved in memory for the next program to access.

Pipelining can also be performed within a software program. For example, the output of a software-implemented function F1 may be fed as input into a second software-implemented function F2, both of which may be implemented in the same software program P. When serially executing functions in an application, the result of each function in the pipeline is typically saved in memory for the next function to access. That is, the output of F1 is stored to storage locations in volatile memory, and read from those locations in volatile memory when provided as input to F2.

Similarly, database engines pipeline functions according to a query plan. Specifically, in response to receiving a query, a "planner" within a database engine may generate a plan to accomplish the operations specified in the query. Such plans often involve feeding the results produced by one function into another function. When executing the query plan, each function may be executed serially, and the intermediate results generated by each function are saved to memory. Subsequent functions in the query plan can access the saved intermediate results from preceding functions, generate new results, and save the new results in memory for further subsequent functions to access. Saving and accessing intermediate results incurs a heavy performance penalty, requires more power, consumes memory bandwidth, and increases the memory footprint.

For example, in response to a query, a planner may determine that data from a particular table must be decompressed, the decompressed data must be scanned to identify data that matches criteria specified in the query, and the matching data thus identified must be transformed to produce the results required by the query. The transformed results are then to be returned to the requestor.

To execute such a plan, a first function accesses the compressed data in memory, decompresses the data, and stores the decompressed data back into memory. A second function accesses the decompressed data stored in memory, scans the decompressed data for specific data matching the query parameters, and stores the matching data back into memory. A third function accesses the matching data in memory, transforms the matching data, and stores the transformed matching data back into memory. Finally the transformed matching data is returned to the user or application that issued the query. In this example, the intermediate results (the decompressed data and the matching but not yet compressed data) were written and accessed in memory, which incurred a heavy performance penalty.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation in the figures of the accompanying drawings and in which like reference numerals refer to similar elements and in which.

DETAILED DESCRIPTION

Figure 1:
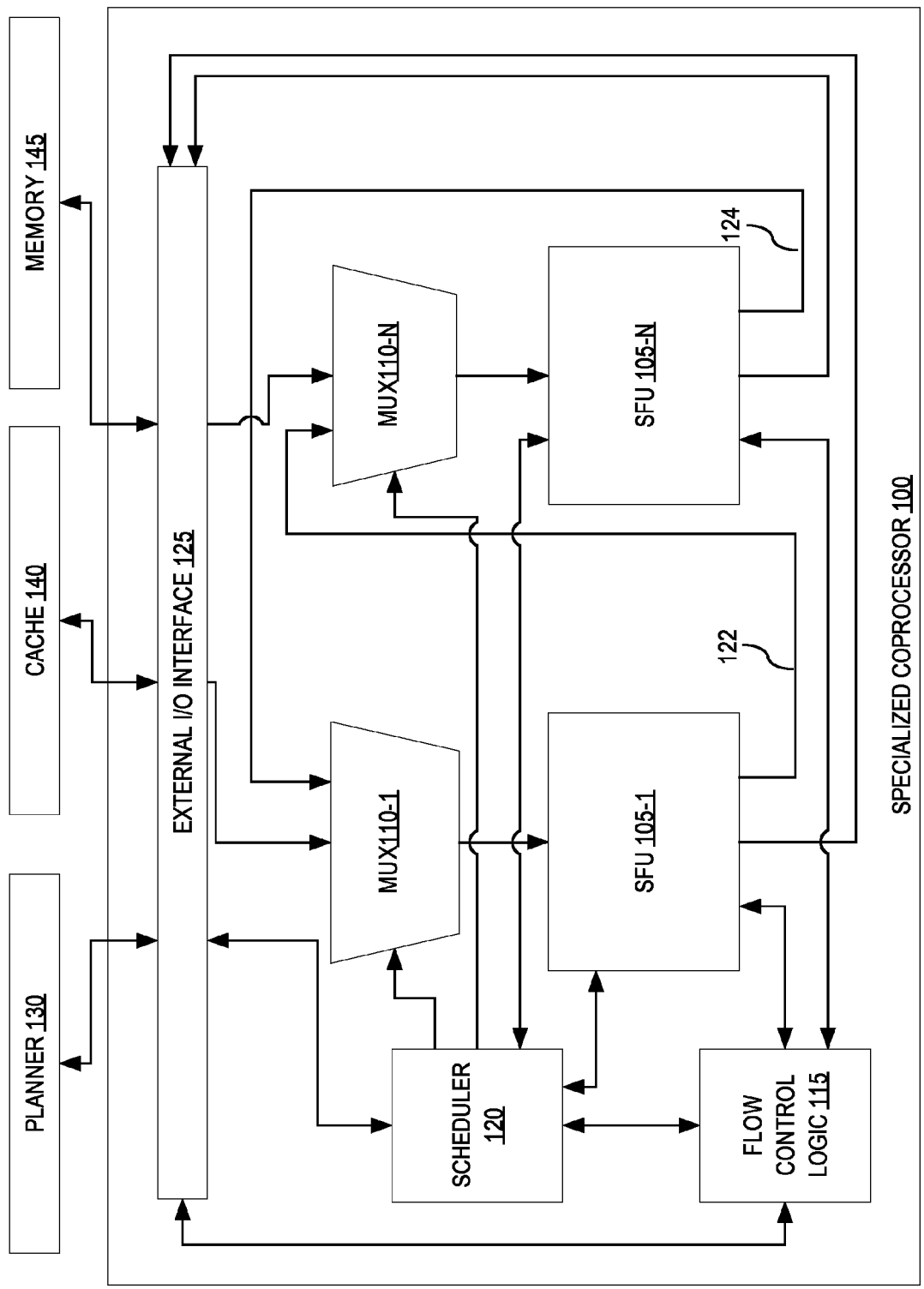
FIG. 1 is a block diagram that illustrates a specialized coprocessor, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Pipelining functions in a program is typically performed by a first function saving its intermediate results to memory, and a second function subsequently accessing the memory to use the intermediate results produced by the first function as input. As mentioned above, saving and accessing intermediate results incurs a heavy performance penalty, requires more power, consumes more memory bandwidth, and increases the memory footprint.

An efficient system for reconfiguring hardware structures to perform functional pipelining on a specialized coprocessor, without storing intermediate results to memory, is described herein. The specialized coprocessor is specialized circuitry and comprises a first streaming functional unit ("SFU") that is operatively coupled to a second SFU, such that the intermediate results from the first SFU are streamed to the second SFU, based on an execution plan, without storing the intermediate results from the first SFU to memory.

The term "specialized circuitry" refers to digital circuits that perform a set of functions, and that are either hardwired to perform the set of one or more specific functions or persistently programmed to perform the set of one or more specific functions. Persistently programmed digital circuits include digital electronic application-specific integrated circuits (ASICs) or field programmable gate arrays (FPGAs). Specialized circuitry does not include a general purpose processor that is configured to perform functions by executing the memory-stored instructions of a computer program.

In contrast, the term "software" refers to an instruction set or program executed by digital circuits that perform an expansive set of functions on a general purpose processor. Software is neither hardwired nor persistently programmed to perform specific functions. While software can be used to implement expansive functionality, software typically performs slower and requires more overhead than functions performed by specialized circuitry. For convenience of expression, when software is described as performing an act, instructions are being executed on a general purpose processor to perform the act.

Due to the ability of the specialized coprocessor to reconfigure the output of the SFUs, intermediate results are passed directly from one SFU to another without storing the intermediate results in memory or non-volatile storage. Accordingly, a program that utilizes the specialized coprocessor increases performance, reduces power consumption, consumes less memory bandwidth, and reduces the program's memory footprint.

Specialized Coprocessor

A specialized coprocessor is specialized circuitry designed to process execution plans using one or more SFUs. An execution plan includes, but is in no way limited to, a set of functions that should be executed in a particular order. The same functions, however, may not always be executed in every execution plan. Furthermore, the same functions may not be called in the same order in every execution plan.

Thus, based on one execution plan, the specialized coprocessor may be dynamically configured, such that the output of a first SFU performing a first function may be fed as input to a second SFU performing a second function, without storing the intermediate results in memory. Based on another execution plan, the same specialized coprocessor may be dynamically reconfigured, such that the output of the second SFU performing the second function may be fed as input to the SFU performing the first function, without storing the intermediate results in memory. Based on still another execution plan, the same specialized coprocessor may be dynamically reconfigured such the output of the first SFU performing a third function may be fed as input to the second SFU performing the second function, without storing the intermediate results in memory.

In an embodiment, the specialized coprocessor is located on-chip of a general purpose processor. However, in another embodiment, the specialized coprocessor may be located on the same board, but not the same chip, as a general purpose processor. Alternatively, the specialized coprocessor may be located elsewhere, and merely operatively coupled with a general purpose processor. Furthermore, the specialized coprocessor may be operatively coupled with other specialized coprocessors.

In an embodiment, the function set a particular specialized coprocessor may perform may be extremely specialized, in order to drastically reduce the size of the specialized coprocessor. For example, where there is limited space on-chip, such that another general purpose core would not fit, a specialized coprocessor may still fit. This configuration, in some embodiments, may further allow for several specialized coprocessors to be located on a chip, each performing a very specific function set.

FIG. 1 is a block diagram that illustrates a specialized coprocessor, according to an embodiment. While FIG. 1 illustrates an embodiment, other embodiments may omit, add to, reorder, and/or modify any of the elements shown. In the embodiment illustrated in FIG. 1, specialized coprocessor 100 comprises SFU 105-1 through SFU 105-N (collectively "SFUs 105"), multiplexer 110-1 through multiplexer 110-N (collectively "multiplexers 110"), flow control logic module 115, scheduler 120, and external I/O interface 125. Specialized coprocessor 100 is operatively coupled with planner 130, cache 140, and memory 145. Each component will be discussed in detail in the sections below.

Streaming Functional Unit ("SFU")

SFUs are specialized circuitry that take one or more streams of data, perform a function, and produce an output. The output may be streamed to a plurality of components, including, but in no way limited to, one or more other SFUs, one or more multiplexers, cache, memory, or non-volatile storage.

Functionality

An SFU may perform a particular set of functions. Furthermore, the set of functions each SFU may perform may be the same. SFUs that are capable of performing several functions may be dynamically configured, from an external source, to perform whichever of the supported functions is currently needed.

In an embodiment, SFUs may be designed to perform application-specific functions. When the application is query processing, the SFU may perform database-specific functions. For example, an SFU may, but is in no way limited to, perform the following database-specific functions without executing software: Extract, Scan Value, Scan Range, Select, Translate, Sync, No-op, or Interrupt.

Some SFUs may perform a function that other SFUs on the same specialized coprocessor do not. For example, a particular SFU may be configured to perform a function unique to the other SFUs on a specialized coprocessor, including, but in no way limited to, inter-processor communications, communication between other specialized coprocessors, authorization functions, encryption/decryption functions, compression/decompression, or encoding/decoding functions. Furthermore, a particular SFU with a particular function may be expensive to manufacture, or may require more space. Accordingly, the particular SFU may be the only SFU on the specialized coprocessor able to perform the particular function. Further still, in an embodiment, an SFU may only perform one function.

In an embodiment, the functions that an SFU may perform are single cycle or a short fixed number of cycles. Furthermore, SFUs may be primarily stateless.

Topology

In the embodiment illustrated in FIG. 1, SFUs 105 stream output to one or more destinations, including, but in no way limited to, SFUs 105, multiplexers 110, external I/O interface 125, cache 140, and memory 145. Accordingly, SFUs 105 are operatively coupled with multiplexers 110, external I/O interface 125, cache 140, and memory 145. In particular, line 122 connects the output of SFU 105-1 to the multiplexer 110-N, which may select the 1 input to stream to SFU 105-N. Similarly, line 124 connects the output of SFU 105-N to the multiplexer 110-1, which may select the input to stream to SFU 105-1.

Alternatively, in an embodiment, a first SFU may be directly coupled with a second SFU, without an intermediary multiplexer. Furthermore, in another embodiment, SFUs 105 may be operatively coupled in a circular configuration, such that the output of a first SFU is directed to a second SFU, and the output of the second SFU is directed back to the first SFU.

Figure 2:
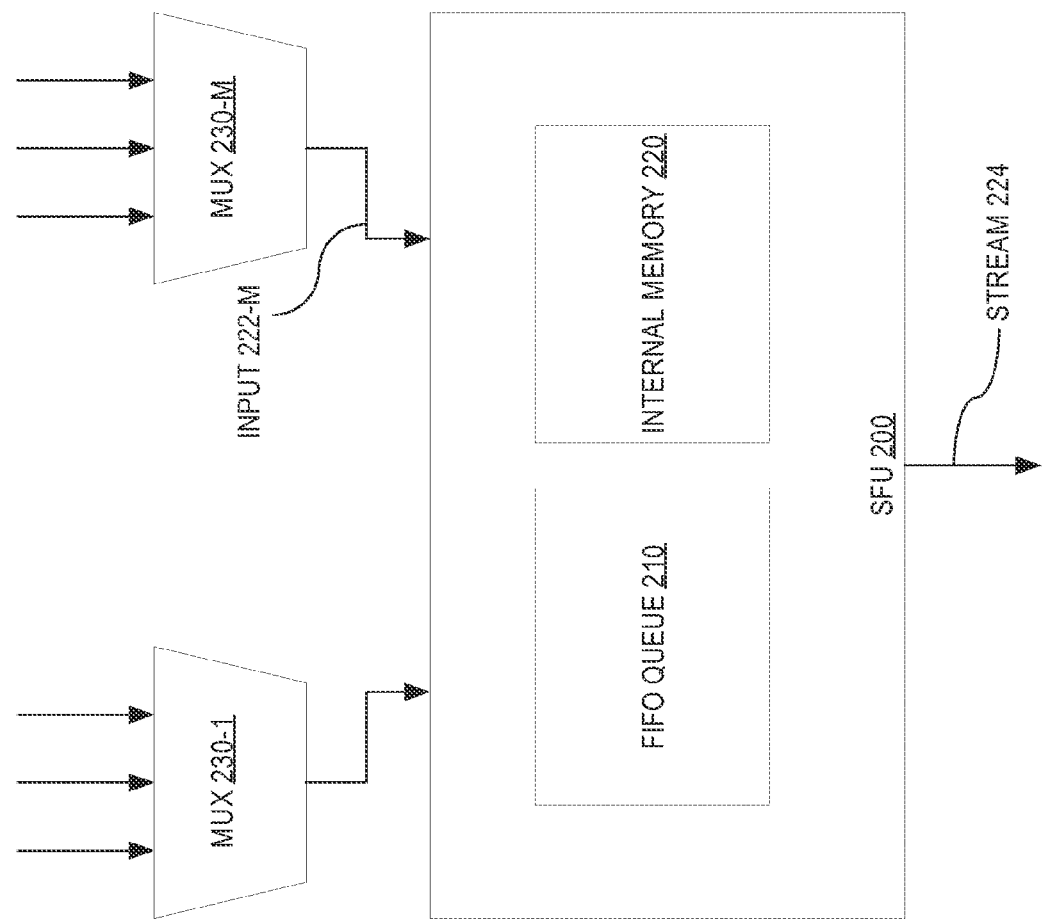
FIG. 2 is a block diagram that illustrates an streaming functional unit ("SFU"), according to an embodiment.

FIG. 2 is a block diagram that illustrates an SFU, according to an embodiment. While FIG. 2 illustrates an embodiment, other embodiments may omit, add to, reorder, and/or modify any of the elements shown. In the embodiment illustrated in FIG. 2, SFU 200 comprises a FIFO Queue 210 and internal memory 220. SFU 200 has M inputs (collectively "inputs 222") each of which is operatively coupled with one of multiplexers 230-1 through 230-M (collectively "multiplexers 230").

FIFO queue 210 buffers the input from one or more sources. For example, SFU 200 may be temporarily unable to keep up with the incoming streaming data, therefore the streaming data is buffered in FIFO queue 210. Ideally, each input receives streaming data at the same rate that SFU 200 can process the data. Thus, in an embodiment, FIFO queue 210 is very small since little data needs to be buffered, and the data that is buffered will be quickly dequeued and processed. Unfortunately, however, it may be the case that SFU 200 processes data more slowly than the rate at which SFU 200 receives input. For example, a first SFU performs a first function on streaming data, and the results are piped to a second SFU, which performs a second function, wherein the second function takes longer to perform than the first function. Accordingly, the results of the first function, performed by the first SFU, may be buffered in the second SFU's FIFO queue. Thus, in another embodiment, FIFO Queue 210 may be a substantial size.

Internal memory 220 provides SFU 200 a block of memory to perform the function SFU 200 is currently performing. Some functions performed by SFU 200 may require more memory than others. Accordingly, the size of internal memory 220 may vary from one embodiment to another depending on the functions SFU 200 may perform.

Multiplexers 230 receive inputs from multiple sources and may each forward one data stream to a corresponding input of SFU 200. For example, multiplexer 230-1 may allow data from a first SFU to stream to SFU 200, while multiplexer 230-M may allow data from an external source to stream to SFU 200. Alternatively, multiplexer 230-M may allow data from a second SFU to stream to input 222-M of SFU 200. SFU 200 may then take the streaming inputs from each of multiplexers 230, regardless of which input each of multiplexers 230 allow, perform a function, and output the result in a new stream 224. New stream 224 may be sent to one or more subsequent multiplexers, SFUs, or any combination of multiplexers and SFUs.

Exemplary Process

Figure 3:
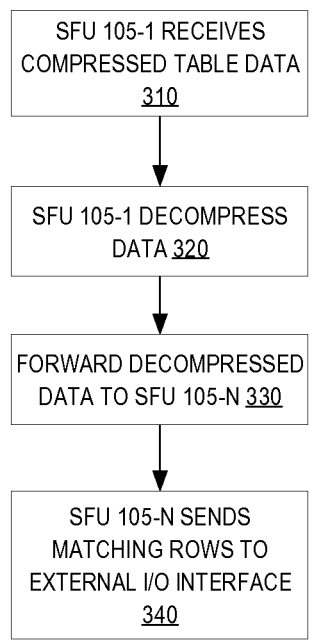
FIG. 3 is a flowchart illustrating SFUs processing an execution plan, according to one embodiment.

FIG. 3 is a flowchart illustrating SFUs processing an execution plan, according to one embodiment. While FIG. 3 illustrates exemplary steps according to an embodiment, other embodiments may omit, add to, reorder, and/or modify any of the steps shown.

As shown in FIG. 3, using the embodiment illustrated in FIG. 1 as an example, in step 310, SFU 105-1 receives compressed table data from external I/O interface 125, through multiplexer 110-1. In step 320, SFU 105-1 decompresses the data and streams the resulting decompressed data to multiplexer 110-N. In step 330, Multiplexer 110-N forwards the decompressed data stream to SFU 105-N. In step 340, SFU 105-N receives the decompressed data stream, performs a table scan for columns with specific values, and streams the rows with matching column values back to external I/O interface 125.

Multiplexers

As briefly discussed above, multiplexers receive inputs from multiple sources and may each forward one data stream to an SFU. For example, returning to the embodiment illustrated in FIG. 1, multiplexer 110-1 may receive input from SFU 105-N and external I/O interface 125. Multiplexer 110-1 forwards either data streaming from SFU 105-N or external I/O interface 125, exclusively, based on input from scheduler 120. Similarly, multiplexer 110-N may receive input from SFU 105-1 and external I/O interface 125. Multiplexer 110-N forwards either data streaming from SFU 105-1 or external I/O interface 125, exclusively, based on input from scheduler 120. Thus, according to the embodiment illustrated in FIG. 1, multiplexers 110 are operatively coupled to SFUs 105, scheduler 120, and external I/O interface 125.

Flow Control Logic Module

Flow control logic module 115 is a module that synchronizes operations across a specialized coprocessor by working in concert with a scheduler. Specifically, based on an execution plan, and the state of the SFUs required by that execution plan, flow control logic module 115 synchronizes processing between inputs and SFUs.

Functionality

As mentioned above, flow control logic module 115 synchronizes processing across the components required for a particular execution plan. If a particular SFU, required by a particular execution plan, is not ready or available, then flow control logic module 115 will halt streaming on all the inputs until the particular SFU is ready and available. Furthermore, if all the inputs for a particular SFU, required by a particular execution plan, are not yet available, then flow control logic module 115 will halt streaming on all the inputs and halt processing on the particular SFU until all the inputs are ready to stream. Flow control logic module 115 may also start, stop, or throttle streaming or processing on one or more inputs or SFUs, such that the input does not overflow FIFO queue 210 in a receiving SFU. Furthermore, flow control logic module 115 may also start, stop, or throttle streaming or processing on one or more receiving SFUs such that a receiving SFU does not try to perform a function when the input may not arriving quickly enough. Accordingly, flow control logic module 115 may be aware of the source and destination of each function in an execution plan and the state of the SFUs it manages.

For example, to perform an execution plan wherein a first SFU streams output to a second SFU, the second SFU may need to be available and ready for processing when the first SFU begins processing; otherwise the intermediate data may be lost. To prevent data loss, flow control logic module 115 may stop processing on the first SFU until a second SFU is ready and available to receive the output of the first SFU. Similarly, if two data streams are required as input for a particular SFU, e.g., a first input from a first SFU and a second input from the external I/O interface, flow control logic module 115 may instruct the first SFU or the external I/O interface to halt from streaming data until both are ready to begin streaming.

Flow control logic module 115 may also notify the scheduler when a particular execution plan has been processed. Flow control logic module 115 may be further configured to update the scheduler with the state of each of the SFUs flow control logic module 115 manages. Additionally, flow control logic module 115 may also instruct each of the SFUs to perform a particular function based on an execution plan.

Topology

In the embodiment illustrated in FIG. 1, flow control logic module 115 receives execution plans from scheduler 120. Accordingly, flow control logic module 115 monitors and instructs the components in specialized coprocessor 100, including, but in no way limited to, SFUs 105 and external I/O interface 125. Flow control logic module 115 may also report to scheduler 120 that a particular execution plan has been processed. Thus, flow control logic module 115 is operatively coupled to SFUs 105, scheduler 120, and external I/O interface 125.

Exemplary Process

Figure 4:
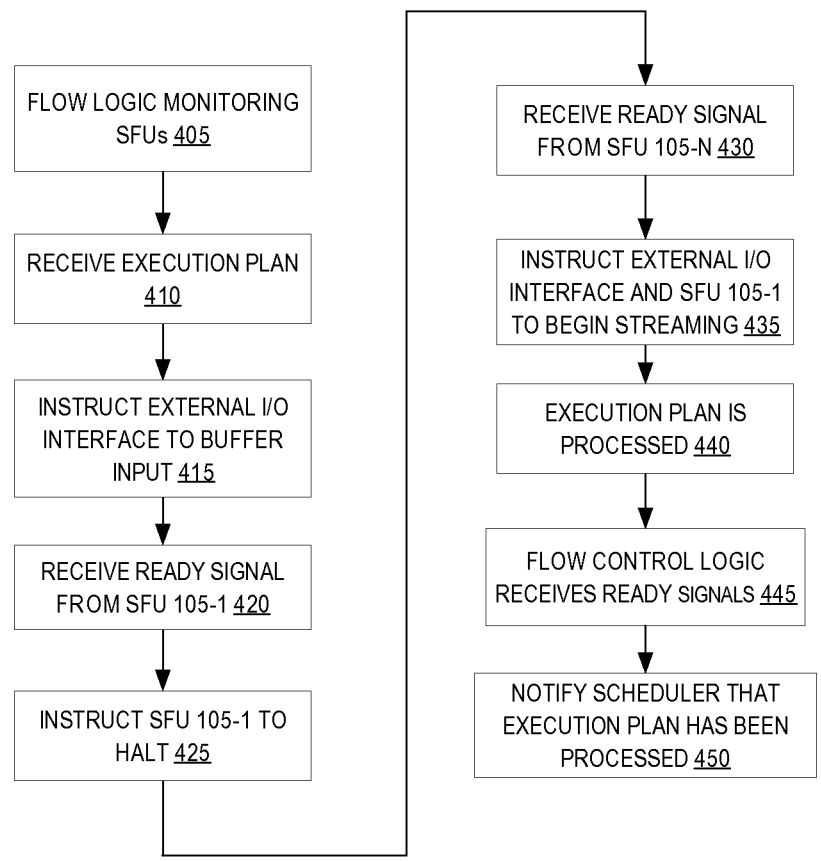
FIG. 4 is a flowchart illustrating a flow control logic module managing an external I/O interface and two SFUs processing an execution plan, according to an embodiment.

FIG. 4 is a flowchart illustrating flow control logic module managing an external I/O interface and two SFUs processing an execution plan, according to an embodiment. While FIG. 4 illustrates exemplary steps according to an embodiment, other embodiments may omit, add to, reorder, and/or modify any of the steps shown.

As shown in FIG. 4, using the embodiment illustrated in FIG. 1 as an example, in step 405, flow control logic module 115 monitors SFUs 105, and is aware that SFU 105-1 and SFU 105-N are executing a first execution plan. Thus, flow control logic module 115 will halt any components performing a subsequent execution plan, wherein the execution plan requires SFU 105-1, until SFU 105-1 is available and ready for processing. Similarly, flow control logic module 115 will halt any components performing a subsequent execution plan, wherein the execution plan requires SFU 105-N, until SFU 105-N is available and ready for processing.

In step 410, flow control logic module 115 receives a second execution plan from scheduler 120 instructing: SFU 105-1 to decompress table data streaming from external I/O interface 125; and SFU 105-N to scan the decompressed table data for columns with specific values, and stream the rows with matching column values back to external I/O interface 125. In step 415, since, in this example, SFU 105-1 and SFU 105-N are currently processing the first execution plan, and are thus unavailable, flow control logic module 115 instructs external I/O interface 125 to halt streaming the compressed data.

In step 420, flow control logic module 115 receives a ready signal from SFU 105-1. Since, however, flow control logic module 115 has not received a ready signal from SFU 105-N, flow control logic module 115 responds by instructing SFU 105-1 to halt to prevent SFU 105-1 from streaming data to unavailable SFU 105-N, in step 425. Accordingly, flow control logic module 115 does not instruct external I/O interface 125 to begin streaming the compressed data to SFU 105-1 since SFU 105-1 has been instructed to halt.

In step 430, flow control logic module 115 receives a ready signal from SFU 105-N. Since both SFU 105-1 and SFU 105-N are now available and ready to receive streaming data, and external I/O interface is ready to stream the input data, flow control logic module 115 notifies scheduler 120 that SFUs 105 are ready for processing and the external I/O interface is ready to stream the compressed table data. Furthermore, flow control logic module 115 instructs external I/O interface 125 to begin streaming the compressed data to SFU 105-1, and instructs SFUs 105 to begin processing, in step 435. Accordingly, in step 440, the second execution plan is processed by SFUs 105 according to FIG. 3, steps 310 through 340, described in detail above.

In step 445, flow control logic module 115 receives ready signals from SFUs 105-1 and 105-N, respectively, indicating that both SFUs 105 have finished processing and are ready and available to begin processing another execution plan. Accordingly, flow control logic module 115 notifies scheduler 120, that the second execution plan has been executed, in step 450.

Scheduler

A scheduler receives execution plans from a planner, determines which SFUs to use and which function each SFU should perform for a particular execution plan, manages multiplexers, monitors SFU states, controls where results are stored, and updates the planner.

Receiving Execution Plans

In an embodiment, the scheduler receives and processes one execution plan at a time from a planner. For example, the scheduler may: receive an execution plan from a planner; process the execution plan; and return the results, the location of the results, or a signal to indicate processing has finished, to the planner. Subsequent to indicating the processing has finished, the scheduler may receive another execution plan to process.

The execution of a particular execution plan, however, may exceed the time in which the planner receives another request, generates a new execution plan, and attempts to send the new execution plan to the scheduler. Thus, in an embodiment, a scheduler may maintain a first-in-first-out ("FIFO") execution plan queue, which executes enqueued plans serially.

Including a queue on the scheduler further enables the scheduler to maximize throughput. For example, an execution plan queue may contain two execution plans, a first execution plan that requires two SFUs, and a second execution plan that requires two SFUs. If there are four SFUs on a specialized coprocessor, then the scheduler may process the first and second plans in parallel.

Additionally, the execution plan queue may be a priority queue. In some cases, the scheduler may have a higher throughput by implementing a priority queue. For example, an execution plan queue may contain three execution plans, a first execution plan that requires two SFUs, a second execution plan that requires four SFUs, and a third execution plan that requires two SFUs. If there are four SFUs on a specialized coprocessor, then the scheduler may process the first and third plans in parallel first before processing the second execution plan, which requires all four SFUs, regardless of the order of the execution plans in the queue. The scheduler may also use other factors associated with an execution plan in determining the priority of the queue, including, but in no way limited to, a priority indicator, the estimated computing time, the size of the data to be processed, the estimated size of the output, and/or the resources required.

SFU Selection

The scheduler selects one or more SFUs to perform a particular execution plan. As discussed above, each SFU performs a limited number of streaming functions; however, one SFU may be programmed to perform a function that the other SFUs are not. Furthermore, a different number of SFUs may be available at any given time. Accordingly, the scheduler is aware of the availability and functionality of each SFU and may select a particular SFU to perform a particular function in a particular execution plan based on the availability and functionality of each SFU. The scheduler may be particularly suited to select one or more SFUs to perform a particular execution plan because the scheduler may be specialized circuitry, located on the specialized coprocessor, thus the scheduler can select and monitor SFUs very quickly.

To select a particular SFU, the scheduler may direct the appropriate input to the particular SFU and instruct the particular SFU to perform a function according to the execution plan. For SFUs that are capable of performing multiple functions, the scheduler may send control signals to the SFUs to dynamically configure the SFUs to perform the functions needed to execute the execution plan. Alternatively, as discussed above, the scheduler may instruct and monitor multiplexers and SFUs through flow control logic module 115. Many other methods may be used to direct the appropriate input to the particular SFU and instruct the particular SFU to perform a function according to the execution plan.

Storing Output and Notifying Planner of Completion

The scheduler may direct the output to the planner, or any storage system or device, including, but in no way limited to, cache, main memory, or persistent storage. The scheduler may also inform the planner that the execution plan has been executed and the location of the resulting data.

For example, using the embodiment illustrated in FIG. 1, planner 130 may send scheduler 120 an execution plan, which includes a specific location to store the results. The output may be a location in cache 140, memory 145, persistent memory (not shown in FIG. 1), or another device (not shown in FIG. 1). In an embodiment, the cache may be non-uniform cache, and the planner may instruct the scheduler to store the results of an execution plan in a particular location in the cache in order for another particular core on-chip to consume the output of the specialized coprocessor. Alternatively, scheduler 120 may determine the location of the output and allocate space accordingly. Regardless of whether scheduler 120 or planner 130 determines the destination of the output, scheduler 120 may send a signal to, an interrupt to, or otherwise notify, planner 130 that the execution plan has been processed.

Topology

In the embodiment illustrated in FIG. 1, scheduler 120 maintains an execution plan queue, determines which SFUs 105 to use for each execution plan, manages multiplexers 110, monitors the states of SFUs 105, controls where results are stored, and updates planner 130. Accordingly, scheduler 120 is operatively coupled with SFUs 105, multiplexers 110, flow control logic module 115, external I/O interface 125, planner 130, cache 140, and memory 145.

In an embodiment the scheduler is specialized circuitry. Alternatively, the scheduler may be software executed on a general purpose processor.

Exemplary Process

Figure 5:
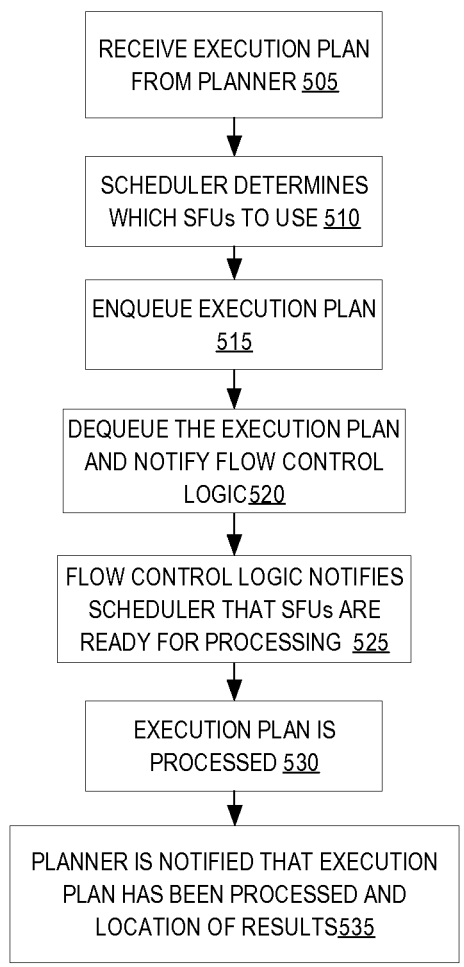
FIG. 5 is a flowchart illustrating a scheduler receiving an execution plan from a planner, processing the execution plan, storing the results, and updating the planner, according to an embodiment.

FIG. 5 is a flowchart illustrating a scheduler receiving an execution plan from a planner, processing the execution plan, storing the results, and updating the planner, according to an embodiment. While FIG. 5 illustrates exemplary steps according to an embodiment, other embodiments may omit, add to, reorder, and/or modify any of the steps shown.

As shown in FIG. 5, using the embodiment illustrated in FIG. 1 as an example, in step 505, scheduler 120 receives an execution plan from planner 130. The execution plan from planner 130 instructs scheduler 120 to decompress table data stored in memory 145, scan the decompressed table data for columns with specific values, and stream the rows with matching column values back to cache 140.

In step 510, scheduler 120 determines which SFUs 150 to use to process the execution plan, and which particular function each SFU will perform, based on the availability and functionality of each SFU. In this example, scheduler 120 determines to instruct SFU 105-1 to decompress table data stored in memory 145, which will stream from external I/O interface 125; and SFU 105-N to scan the decompressed table data for columns with specific values, and stream the rows with matching column values back to external I/O interface 125. Scheduler 120 also determines based on the execution plan received from planner 130, the location to store the results in cache 140. Scheduler 120 then enqueues the execution plan in the execution plan queue, in step 515.

In step 520, scheduler 120 selects the execution plan from the execution plan queue for processing based on the availability of SFUs 105, the execution plan's estimated computing time, the size of the data to be processed, and the estimated size of the output. Scheduler 120 dequeues the execution plan from the execution plan queue. Scheduler 120 also forwards the execution plan to flow control logic module 115 in order to synchronize processing of the execution plan.

In step 525, flow control logic module 115 notifies scheduler 120 that SFUs 105 are ready for processing and external I/O interface 125 is ready to stream the compressed table data, as discussed above and illustrated in FIG. 4, step 430. Scheduler 120 instructs each of the SFUs 105 to perform a particular function, which was determined in step 510. Scheduler 120 instructs multiplexers 110 to forward the correct inputs to SFUs 105, respectively. Scheduler 120 also instructs external I/O interface 125 to store the result in cache 140.

In step 530, the execution plan is processed as illustrated in FIG. 4, steps 435 through 450, and as discussed above. In step 535, upon notification that the execution plan has been processed, scheduler 120 notifies planner 130 that the execution plan has been processed and where the results are stored.

Planner

A planner receives a request for data and formulates an execution plan. The planner may then send the execution plan to a scheduler to be executed using one or more SFUs. Upon completion of the execution plan, the scheduler may notify the planner that the execution plan has been executed and the results saved.

The execution plan generated by the planner may include, but is in no way limited to, a plurality of functions to be executed, the order the functions should be executed in, the location or source of the initial input, and the location or destination of the output. For example, in response to receiving a request for data stored in a particular file, the planner may formulate an execution plan to retrieve the file from persistent storage, decompress the data, scan the data for a particular subset, compress the result, and store the result to a specific block of memory allocated for the response.

The location or destination of the output designated by the planner may be specific within a particular storage unit or device. For example, if the planner knows that subsequent to processing the execution plan the data will be subject to further processing by a particular processing unit, other than the specialized coprocessor, the planner may include in the execution plan the exact location in the on-chip cache the results should be stored in, closest to the particular processing unit. In another example, the planner may include in the execution plan the address of another coprocessor on the same machine, or on the same network, to send the results to.

Topology

In the embodiment illustrated in FIG. 1, planner 130 is software executed on a general purpose processor. Planner 130 is operatively coupled to scheduler 120, through external I/O interface 125. Planner 130 may be executed on the same general purpose processor that specialized coprocessor 100 resides on. In another embodiment, however, planner 130 may be executed on a different general purpose processor, operatively coupled to specialized coprocessor 100. Alternatively, planner 130 could be specialized circuitry located on specialized coprocessor 100, or another coprocessor located on the same machine or network.

In an embodiment, planner 130 may be operatively coupled to a plurality of specialized coprocessors. Furthermore, planner 130 may send execution plans to, receive data from, and/or coordinate operations across the plurality of specialized coprocessors.

Exemplary Process

Figure 6:
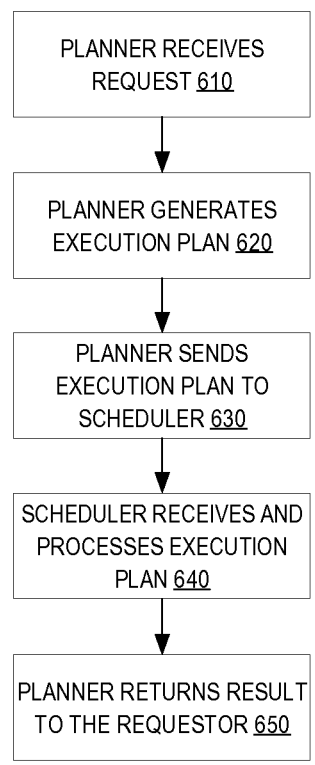
FIG. 6 is a flowchart illustrating a planner receiving a request, generating an execution plan, sending the execution plan to a scheduler, and returning the results, according to an embodiment.

FIG. 6 is a flowchart illustrating a planner receiving a request, generating an execution plan, sending the execution plan to a scheduler, and returning the results, according to an embodiment. While FIG. 6 illustrates exemplary steps according to an embodiment, other embodiments may omit, add to, reorder, and/or modify any of the steps shown based on the application or device. Although this embodiment describes a database application sending a database query to a planner, other embodiments may include other applications and other types of queries.

As shown in FIG. 6, using the embodiment illustrated in FIG. 1 as an example, in step 610, planner 130 receives a request from a database application, to return data, from a particular relational table, where the columns match values specified in the predicate of a query. The requestor may be, but is in no way limited to, an application running on the same computer system, or an application running on another computer operatively coupled over a network. Alternatively, the requestor may be, but is in no way limited to, a specialized coprocessor running on the same computer system, or from another computer, operatively coupled over a network.

In step 620, planner 130 generates an execution plan instructing specialized coprocessor 100 to decompress table data stored in memory 145, scan the decompressed table data for columns with specific values, and store the rows with matching column values in cache 140. Planner 130 also allocates space in cache 140, memory 145, or persistent storage (not shown in FIG. 1) to store the results from the query and includes the address in the execution plan. Alternatively, the scheduler may allocate space on cache 140 and include the address in a subsequent response.

In step 630, planner 130 sends the execution plan to scheduler 120. In step 640, scheduler 120 receives and processes the execution plan according to FIG. 5, steps 505 through 535, as discussed above. Planner 130 returns the location of the results stored in cache 140 to the requestor, in step 650.

External I/O Interface

Communication between components on specialized coprocessor 100 and components outside the specialized coprocessor 100 including networked devices may be performed through external I/O interface 125. Accordingly, external I/O interface 125 is operatively coupled with SFUs 105, multiplexers 110, flow control logic module 115, scheduler 120, planner 130, cache 140, and memory 145. Other embodiments may not include external I/O interface, and instead the components on specialized coprocessor 100 are operatively coupled with components outside specialized coprocessor 100 directly, or through another intermediary component or device.

Cache

Cache 140 may be located on-chip of a general purpose processor, and may be used to store results from specialized coprocessor 100. Accordingly, cache 140 is operatively coupled with external I/O interface 125.

As discussed above, storing results in cache 140 may increase speed of the overall system. For example, planner 130 may plan to have one or more other coprocessors perform one or more operations on the results from specialized coprocessor 100. In such cases, saving results to cache 140 may reduce latency compared to storing or accessing data on memory 145, or persistent-storage, or another device.

Memory

Memory 145 may be located on the same machine or device as the specialized coprocessor, and may be used to store results from specialized coprocessor 100. Accordingly, memory 145 is operatively coupled with external I/O interface 125.

As discussed above, storing results in memory 145, as opposed to persistent storage or anther device, may increase speed of the overall system. For example, on shared memory machines, an application running on a different node of the same cluster may be able to quickly access the results stored in memory 145. In such cases, saving results to memory 145 may reduce latency compared to storing and accessing persistent storage or another device.

Example Processing of Two Execution Plans on a Specialized Coprocessor

As merely an example, in which a user issues two queries to a query planner, the following exemplary process may be carried out on a specialized coprocessor, in an embodiment. This example is in no way meant to be limiting. While this example discusses particular steps according to an embodiment, other examples and other embodiments may omit, add to, reorder, and/or modify any of the steps discussed below.

In step 1: A planner receives a first query from a user for data from a particular table in a relational database matching a set of parameters defined in the first query. The planner determines an execution plan comprising a sequence of functions, specifically: 1) a scan value function that takes a column of data and a constant value as input, and outputs a bit-vector where a one represents a match between the column value and the constant value, and a zero otherwise; and 2) a select function that takes a first bit-vector, a second bit-vector, and table data as input, and returns the values of specific columns, designated by a one in the first bit-vector, for each row where the second bit-vector has a corresponding one. Furthermore, the planner allocates a specific amount of memory starting at a first location, and designates the first location as the output destination of the execution plan. Finally, the first execution plan is sent to a scheduler on a specialized coprocessor.

In step 2: The scheduler on the specialized coprocessor receives the first execution plan. The scheduler knows that it has two SFUs, each capable of performing a scan value function, a select function, or a translate function. Furthermore, the scheduler knows that the SFUs are not currently performing any functions.

In step 3: The scheduler configures: 1) the first SFU to perform a scan value function, taking as input a constant defined in the first execution plan; 2) a first multiplexer to stream column data from the external I/O interface to the first SFU; and 3) a second multiplexer to stream null to the first SFU. The scheduler also configures: 1) the second SFU to perform a select function taking as an input a bit-vector, with a one corresponding to the column values that should be returned for each row where the second bit-vector has a corresponding one; 2) a third multiplexer to stream the second bit-vector data from the first SFU to the second SFU; and 3) a fourth multiplexer to stream table data from the external I/O interface to the second SFU. The scheduler further configures the external I/O interface to stream the data output by the second SFU to the first location in memory defined in the first execution plan. Further still, the scheduler instructs a flow control logic module to begin processing once the column data and the table data is available for the external I/O interface to begin streaming to the first SFU and second SFU, respectively.

In step 4: The flow control logic module receives a signal from the external I/O interface that the column data and table data are both ready to be streamed. Accordingly, the flow control logic module instructs the first SFU to begin processing the column data. When the results of the first SFU (the second bit-vector) and the table data begin streaming to the second SFU, the flow control logic module instructs the second SFU to begin processing.

In step 5: The planner receives a second request from the user for data from a particular table in the relational database matching a set of parameters defined in the query. The planner determines an execution plan comprising a sequence of functions, specifically: 1) a scan value function that takes a column of data and a constant value as input, and outputs a bit-vector where a one represents a match between the column value and the constant value, and a zero otherwise; and 2) a translate function that takes a bit-vector and column data as input, and returns a compressed version of each column value where the bit-vector has a corresponding one. Furthermore, the planner allocates a specific amount of memory starting at a second location, and designates the second location as the output destination of the second execution plan. Finally, the second execution plan is sent to the scheduler on the specialized coprocessor.

In step 6: The scheduler on the specialized coprocessor receives the second execution plan. The scheduler knows that it has two SFUs capable of performing a plurality of functions designated in the execution plan. However, the scheduler knows that the requisite SFUs are currently processing the first execution plan. Accordingly, the scheduler enequeues the second execution plan because the first execution plan is still processing, and there are no other SFUs available.

In step 7: The flow control logic module receives a ready signal from the first SFU, indicating that the first SFU has finished processing the function it was configured to perform. Accordingly, the flow control logic module instructs the first SFU to halt processing.

In step 8: The flow control logic module receives a ready signal from the second SFU, indicating that the second SFU has finished processing the function it was configured to perform. Accordingly, the flow control logic module instructs the second SFU to halt processing. Furthermore, the flow control logic module notifies the scheduler that the SFUs have finished processing.

In step 9: The external I/O interface notifies the scheduler that the external I/O interface has finished storing the data streaming from the second SFU to memory beginning at the first location. In response, the scheduler notifies the planner that the first execution plan has been processed and the results are stored at the first location.

In step 10: The scheduler dequeues the second execution plan and configures: 1) the second SFU to perform a scan value function, taking as input a constant defined in the second execution plan; 2) the third multiplexer to stream column data from the external I/O interface to the second SFU; and 3) the fourth multiplexer to stream null to the second SFU. The scheduler configures: 1) the first SFU to perform a translate function; 2) the first multiplexer to stream the bit-vector data from the second SFU to the first SFU; and 3) the second multiplexer to stream column data from the external I/O interface to the first SFU. The scheduler configures the external I/O interface to stream the data output by the first SFU, the compressed data, to the first location in memory defined in the second execution plan. The scheduler instructs the flow control logic module to begin processing once the column data is available for external I/O interface to begin streaming to the first SFU and second SFU.

In step 11: The flow control logic module receives a signal from external I/O interface that the column data is ready to be streamed. The flow control logic module instructs the second SFU to begin processing the column data. When the results of the second SFU (the bit-vector) and the column data begin streaming to the first SFU, the flow control logic module instructs the first SFU to begin processing.

In step 12: the flow control logic module receives a ready signal from the second SFU, indicating that the second SFU has finished processing the function it was configured to perform. Accordingly, the flow control logic module instructs the second SFU to halt processing.

In step 13: the flow control logic module receives a ready signal from the first SFU, indicating that the first SFU has finished processing the function it was instructed to perform. Accordingly, the flow control logic module instructs the first SFU to halt processing. Furthermore, the flow control logic module notifies the scheduler that the SFUs have finished processing.

In step 14: The external I/O interface notifies the scheduler that the external I/O interface has finished storing the data streaming from the first SFU to memory beginning at the second location. In response, the scheduler notifies the planner that the second execution plan has been processed and the results are stored at the second location.

Hardware Overview

According to one embodiment, the techniques described herein are implemented by one or more special-purpose computing devices. The special-purpose computing devices may be hard-wired, or may include digital electronic devices such as one or more application-specific integrated circuits (ASICs) or field programmable gate arrays (FPGAs) that are persistently programmed. The techniques may be performed by a computing device that includes, in addition to a coprocessor containing SFUs, one or more general purpose hardware processors programmed pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
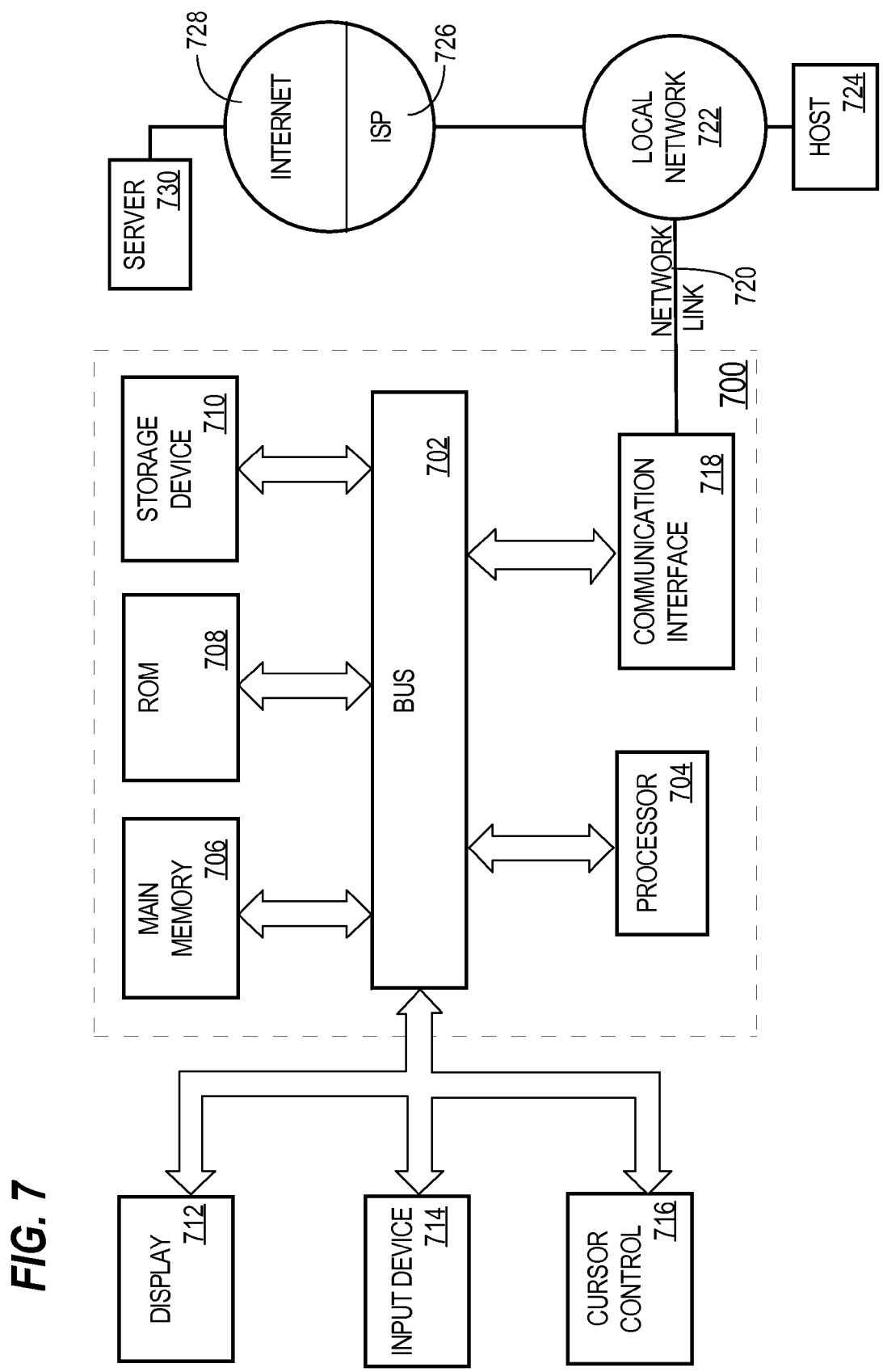
FIG. 7 is a block diagram that illustrates a computer system 700 upon which an embodiment of the invention may be implemented.

For example, FIG. 7 is a block diagram that illustrates a computer system 700 within which a coprocessor, as described herein, may be used. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A device comprising:
   a first streaming functional unit, wherein the first streaming functional unit is specialized circuitry configured to perform a first particular function;
   a first multiplexer operatively coupled between the first streaming functional unit and a first plurality of potential input sources;
   wherein the first multiplexer is dynamically configurable to pass streaming input from a selected one of the first plurality of potential input sources to the first streaming functional unit;
   a second streaming functional unit, wherein the second streaming functional unit is specialized circuitry configured to perform a second particular function;
   a second multiplexer operatively coupled between the second streaming functional unit and a second plurality of potential input sources;
   wherein the second multiplexer is dynamically configurable to pass streaming input from a selected one of the second plurality of potential input sources to the second streaming functional unit;
   wherein output of the first streaming functional unit is one potential input source, of the second plurality of potential input sources;
   a scheduler configured to:
     receive data indicating an execution plan to be processed;
     determine how to configure the first multiplexer and second multiplexer to make use of the first streaming functional unit and the second streaming functional unit in processing the execution plan; and
     send signals to dynamically configure the first multiplexer and second multiplexer to make use of the first streaming functional unit and the second streaming functional unit in processing the execution plan.

2. The device of claim 1, wherein the scheduler is configured to send signals to:
   cause the first multiplexer to pass streaming input from a first selected input source, of the first plurality of potential input sources, to the first streaming functional unit; and
   cause the second multiplexer to pass streaming input from output of the first streaming functional unit to the second streaming functional unit.

3. The device of claim 1 further comprising:
   a third streaming functional unit, wherein the third streaming functional unit is specialized circuitry configured to perform a third particular function;
   a third multiplexer operatively coupled between the third streaming functional unit and a third plurality of potential input sources;
   wherein the third multiplexer is dynamically configurable to pass streaming input from selected one of the third plurality of potential input sources to the third streaming functional unit;
   a fourth multiplexer operatively coupled between the third streaming functional unit and a fourth plurality of potential input sources;
   wherein the fourth multiplexer is dynamically configurable to pass streaming input from selected one of the fourth plurality of potential input sources to the third streaming functional unit;
   the scheduler is configured to send signals to:
     cause the third multiplexer to pass streaming input from output of the first streaming functional unit to the third streaming functional unit; and
     cause the fourth multiplexer to pass streaming input from output of the second streaming functional unit to the third streaming functional unit.

4. The device of claim 1, wherein the first streaming functional unit is dynamically configurable to perform any one of a plurality of particular functions, and the scheduler is configured to send a signal to cause the first streaming functional unit to perform the first particular function.

5. The device of claim 1, wherein:
   the execution plan is a query plan; and
   the first particular function and the second particular function are database functions required by the query plan.

6. The device of claim 1, further comprising:
   a flow control logic module, wherein the flow control logic module is configured to:

receive a first ready signal from the first streaming functional unit;

receive a second ready signal from the second streaming functional unit.

7. The device of claim 6, wherein the flow control logic module is configured to send signals to:

cause the first streaming functional unit to begin or halt processing; and cause the second streaming functional unit to begin or halt processing.

8. A system comprising:

a planner configured to:

receive a query;

generate an execution plan; and a specialized coprocessor, wherein the specialized coprocessor comprises:

a first streaming functional unit, wherein the first streaming functional unit is specialized circuitry configured to perform a first particular function;

a first multiplexer operatively coupled between the first streaming functional unit and a first plurality of potential input sources;

wherein the first multiplexer is dynamically configurable to pass streaming input from selected one of the first plurality of potential input sources to the first streaming functional unit;

a second streaming functional unit, wherein the second streaming functional unit is specialized circuitry configured to perform a second particular function;

a second multiplexer operatively coupled between the second streaming functional unit and a second plurality of potential input sources;

wherein the second multiplexer is dynamically configurable to pass streaming input from selected one of the second plurality of potential input sources to the second streaming functional unit;

wherein output of the first streaming functional unit is one potential input source, of the second plurality of potential input sources;

a scheduler configured to:

receive data indicating the execution plan to be processed;

determine how to configure the first multiplexer and the second multiplexer to make use of the first streaming functional unit and the second streaming functional unit in processing the execution plan; and send signals to dynamically configure the first multiplexer and the second multiplexer to make use of the first streaming functional unit and the second streaming functional unit in processing the execution plan.

9. The system of claim 8, wherein the planner is software executed on a general purpose processing unit.

10. The system of claim 9, wherein the specialized coprocessor and the general purpose processing unit are on a same chip.

11. The system of claim 8, wherein the planner is specialized circuitry.

12. The system of claim 11, wherein the planner is located on the specialized coprocessor.

13. The system of claim 8, wherein the specialized coprocessor is a first specialized coprocessor of a plurality of specialized coprocessors.

14. The system of claim 13, wherein the planner is operatively connected to the plurality of specialized coprocessors.

15. The system of claim 13, wherein the plurality of specialized coprocessors are located on a same chip with a shared cache.

16. A method comprising performing a machine-executed operation involving a plurality of software instructions, wherein the plurality of software instructions which, when executed by one or more computing devices, cause performance of certain steps comprising:

transmitting a particular execution plan to a specialized coprocessor for processing;

wherein the specialized coprocessor is configured to:

receive an execution plan;

determine how to configure a first multiplexer and a second multiplexer to make use of a first streaming functional unit and a second streaming functional unit in processing the execution plan;

send signals to dynamically configure the first multiplexer and the second multiplexer to make use of the first streaming functional unit and the second streaming functional unit in processing the execution plan;

processing the particular execution plan.

17. The method of claim 16, wherein the particular execution plan indicates a set of functions to be executed by a plurality of streaming functional units in a particular order.

18. The method of claim 16, wherein the particular execution plan indicates a source input and a destination output.

19. The method of claim 16 comprising, sending a signal that the particular execution plan has been processed.

20. The method of claim 16, wherein the specialized coprocessor is configured to determine how to configure the first multiplexer and the second multiplexer based, at least in part, on functionality and availability of the first streaming functional unit and the second streaming functional unit.

* * * * *